UNITED STATES PATENT OFFICE.

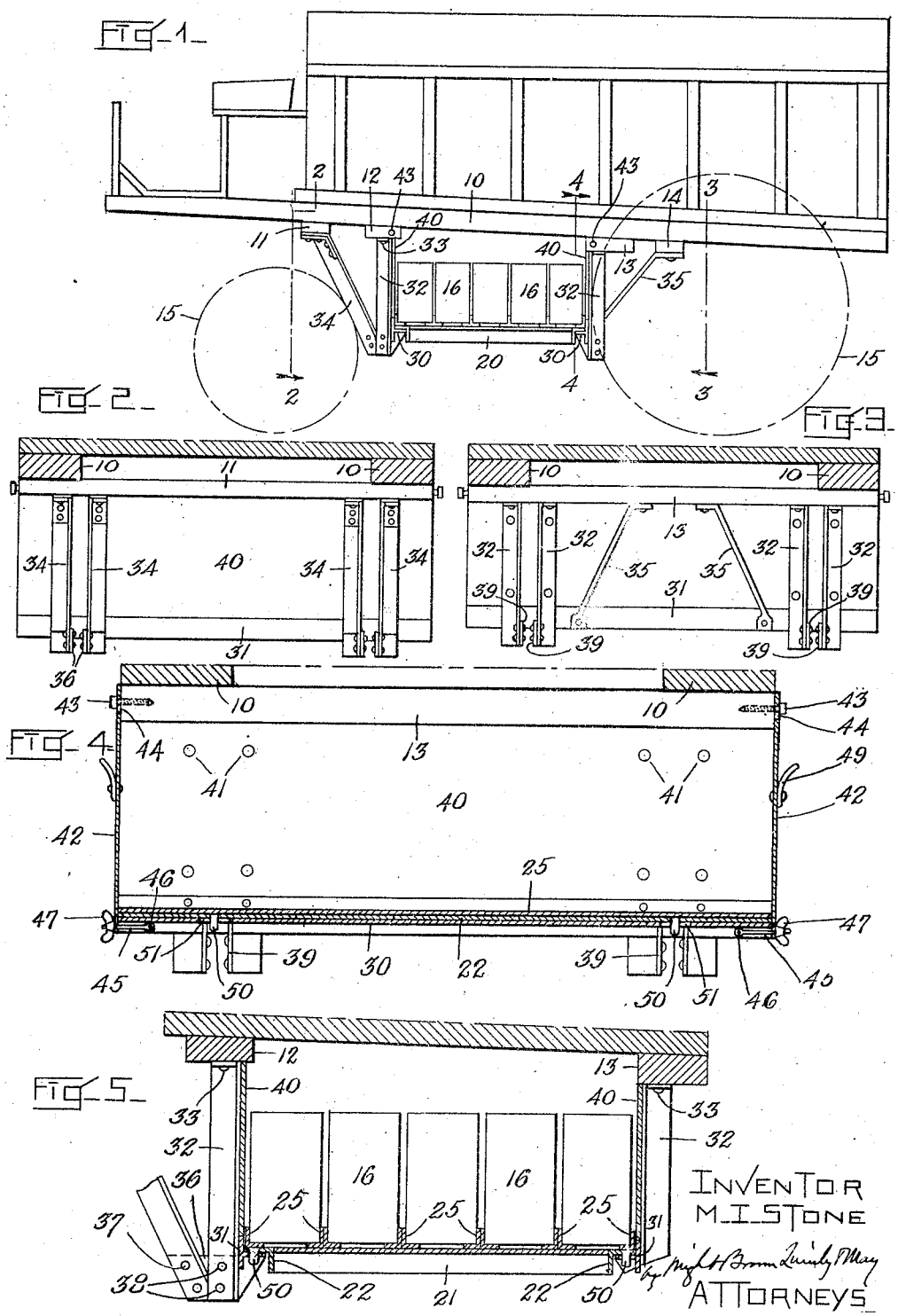

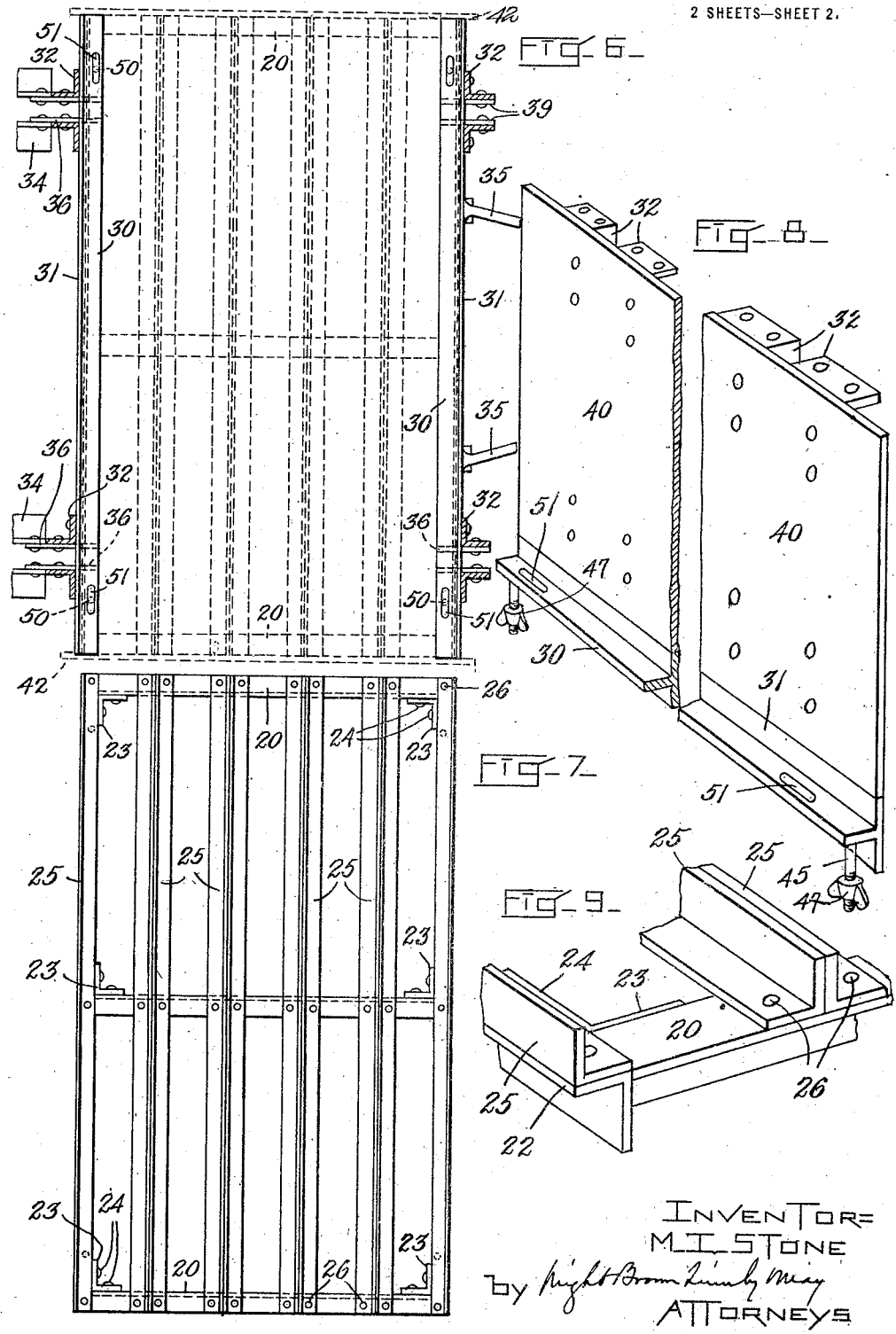

MARSHALL I. STONE, OF NEWTON, MASSACHUSETTS, ASSIGNOR TO WILLIAM P. STONE, OF BOSTON, MASSACHUSETTS.

STORAGE-BATTERY CARRIER.

1,173,616.  Specification of Letters Patent.  Patented Feb. 29, 1916.

Application filed September 21, 1915. Serial No. 51,797.

*To all whom it may concern:*

Be it known that I, MARSHALL I. STONE, a citizen of the United States, and resident of Newton, in the county of Middlesex and State of Massachusetts, have invented certain new and useful Improvements in Storage-Battery Carriers, of which the following is a specification.

Some electric vehicles which are operated by storage batteries carry the latter in boxes, each vehicle having a battery box permanently attached thereto and suspended under the body of the vehicle. The cells are usually set in trays, and the trays are arranged in rows upon the bottom of the box. In order to remove the trays from the box it is necessary first to disconnect the wiring connections and then to take the trays out one at a time. There may be from four to six trays, according to the weight of the vehicle, and each tray may contain from four to nine cells. The handling of the trays is difficult because of the great aggregate weight of the cells contained in each tray. In order, therefore, to replace a discharged battery with a charged battery, considerable time is consumed in disconnecting the wiring between the groups of cells and in transferring the trays one at a time from the battery box to the floor or a truck, in transferring the trays containing the charged cells from the floor or truck to the battery box, one at a time, and in connecting the groups of cells by wiring after the cells have been placed in the battery box.

The object of the present invention is to provide a storage battery holder which will facilitate and expedite the substitution of a charged battery for a discharged battery.

The invention comprises a battery box suspended under and attached to the body of a vehicle, the bottom or battery-supporting platform being detachable and removable edgewise with all the cells of the battery standing thereon. The permanent fixtures of the battery box, that is to say, the portions which remain permanently attached to the vehicle, are arranged to support the removable platform by two opposite marginal portions of the latter and to leave an unobstructed space through which a truck may pass to carry away the platform which contains the discharged battery and through which another truck may pass to carry another platform containing a charged battery into position between the platform-supporting elements of the vehicle.

The full number of cells required for a battery may therefore be assembled on a platform apart from the vehicle and may be connected with each other by wiring as they would be when in use, before they are loaded upon the vehicle. The cells and the platform, being thus prepared for use, may be transferred as a unit to the platform-supporting means attached to the vehicle, and when such unit has been set in place in the vehicle the only operations remaining to be performed are connecting the two main electrical terminals of the permanent vehicle-equipment to the two main terminals of the storage battery, and, if desired, inclosing the battery by attaching two removable walls to the battery compartment to exclude dirt.

Of the accompanying drawings, which illustrate one form in which the present invention may be embodied: Figure 1 represents a side elevation of a vehicle provided with a removable battery-supporting platform, and means supporting the latter. Fig. 2 represents a front elevation of the battery-supporting structure as indicated by line 2—2 of Fig. 1, portions of the vehicle frame being shown in cross section. Fig. 3 represents a rear elevation of the battery-supporting structure, as indicated by line 3—3 of Fig. 1. Fig. 4 represents a sectional view in a vertical plane, as indicated by line 4—4 of Fig. 1. Fig. 5 represents a sectional view of the battery-supporting structure in a vertical plane extending from front to rear of the vehicle. Fig. 6 represents a sectional view in a horizontal plane looking down upon the bars upon which the removable platform rests, said platform being indicated by dotted lines in coöperative relation to said bars. Fig. 7 represents a top plan view of the detachable battery-supporting platform. Fig. 8 represents a perspective view, partly broken out, of the rear portion of the structure which is permanently attached to the vehicle. Fig. 9 is a perspective view of one corner of the detachable battery platform.

The same reference characters indicate the same parts wherever they occur.

The vehicle shown conventionally by Fig. 1 includes longitudinal beams 10, crossbeams 11, 12, 13 and 14, and wheels 15. The cells of a storage battery are contained in boxes or trays 16, 16, and there may be any number of the latter.

My improved carrier for the storage battery comprises a platform on which the trays 16 rest, and a supporting structure permanently fastened to the vehicle, the platform being detachable from the vehicle. The platform may be of any suitable construction, and although the drawings show a construction suitable for the purpose, the scope of the invention does not depend upon the details thereof. As shown, the platform is rectangular and is, for the most part, made of angle irons of L-shaped cross section. It includes two parallel side bars 20, 20, an intermediate bar 21 parallel to the side bars, and cross-bars 22. The cross-bars 22 are affixed to the bars 20 and 21 by any suitable means, such as angle pieces 23 and rivets 24. The bars 20, 20, 21 and 22 are arranged with their horizontal webs uppermost and the vertical webs depending therefrom, the upper surfaces of the horizontal webs being flush with relation to each other. Upon this rectangular frame are arranged a plurality of pairs of cross-bars 25. These bars are also L-shaped in cross section and are arranged so that their horizontal webs are at the bottom (see Fig. 9), and their vertical webs extend upwardly therefrom. The horizontal webs of the bars 25 afford the supporting surfaces for the boxes or trays 16, and the vertical webs of said bars are arranged to engage the vertical sides of the boxes or trays to keep the latter in rows as shown by Figs. 1 and 5. The horizontal webs of the bars 25 are fastened by rivets 26 to the horizontal webs of the bars 20, 20, 21 and 22.

The structure which is permanently attached to the vehicle to support the battery comprises a pair of coöperative hangers one of which is fastened to the cross-beams 11 and 12 and the other of which is fastened to the cross-beams 13 and 14. The essential feature of these hangers is that they include a pair of coöperative shelves 30, 30 separated from each other and arranged to enable a truck to pass between them with a platform adapted to bridge the space between said shelves. The shelves 30, 30, as shown, are horizontal webs of beams 31 of T-shaped cross section, said beams being arranged so that the portions 30, 30 extend toward each other. Each beam 31, as shown, is riveted to a plurality of vertically disposed angle bars 32. The upper ends of these bars are fastened by rivets or bolts 33 to the cross-beams 12 and 13, as the case may be. The bars 32 of the forward hanger are braced by inclined bars 34, and the bars 32 of the rear hanger are braced by bars 35. The upper ends of the bars 34 are fastened to the cross-beam 11, and the lower ends thereof are fastened to flat plates 36 by rivets 37. These plates are fastened to the bars 32 by rivets 38. Each plate 36 has a notch in its upper edge in which the lower vertical web of the forward T-bar 31 is arranged, the horizontal web 30 of said T-bar resting upon the upper edge of said plate as shown by Figs. 1 and 5. These plates, therefore, constitute brackets, for the shelves 30, and they assist in sustaining the load upon the shelves in addition to providing a convenient connection between the lower ends of the braces 34 and forward bars 32. The horizontal web 30 of the rear bar 31 is likewise supported by flat plates 39, the latter being riveted to the rear vertical bars 32 and having notches in their upper edges to receive the lower vertical web of the rear bar 31. The rear braces 35 are arranged to sustain the rear bar 31 against swaying from from to rear of the vehicle and are also arranged to sustain side sway, being for the latter purpose set at angles shown by Figs. 3 and 6.

For the purpose of inclosing the storage battery as much as is consistent with the ventilation required, I provide front and rear walls 40, 40 each of which consists of a plate of sheet metal. These plates are fastened by any suitable means, such as rivets 41, to the bars 32, 32, and they assist in bracing the bars 32 against side sway in addition to the function first stated. The lower edges of the plates 40 rest upon the upper edges of the bars 31, as shown by Figs. 5 and 8.

Detachable plates 42, 42 are provided for inclosing the sides of the battery compartment. The upper marginal portions of these plates are held in place by headed bolts 43 which project laterally from the cross-beams 12 and 13. The plates have keyhole slots 44 whose enlarged ends are at the bottom. A plate 42 is attached by passing it over the heads of the bolts 43, by letting it drop so that the shanks of the bolts will enter the narrow upper ends of the keyhole slots, and by fastening the lower marginal portions to the cross-bars 31. For fastening the lower portions of plates 42 I have shown clamping bolts 45 each of which is connected by a pivot member 46 to the lower vertical web of the bar 31. A nut 47, preferably a wing-nut, is threaded on the bolt 45. The lower edge of each plate 42 is provided with notches 48 to receive the bolts 45. These notches, being open at the bottom, enable the bolts to swing in and out, provided the nut 47 is unscrewed toward the free end of the bolt. After a plate 42 has been set upon the bolts 43 and its lower marginal portion set against the ends of the bars 31, the bolts 45 may be swung upwardly into the notches 48, and when the nuts 47 are set up tightly against the plate, the latter is fastened against the ends of the bars 31 and the bolts are held so that they will not drop out of the notches.

The plates 42 as shown are provided with handles 49.

When the battery-supporting platform is installed in the vehicle it is supported by the webs or shelves 30 of the bars 31. Sometimes the load upon the longitudinal beams 10 of the vehicle is so great as to cause said beams to sag, and such sagging would move the bars 31 away from each other and possibly permit the battery-supporting platform to drop, unless some means were provided to prevent such movement of the bars. I have therefore provided the cross-bars 22 of the battery-supporting platform with vertical dowel pins 50, and have provided the webs or shelves 30 with holes 51 into which the dowel pins extend. The battery-supporting platform thus ties the bars 31 to each other to prevent said bars from being unduly separated, whether the tendency toward separation is due to sagging hereinbefore mentioned or due to sudden stopping or starting of the vehicle.

The method of procedure in substituting a charged battery for a discharged battery involves the use of small trucks for carrying the battery-supporting platforms. Such trucks would preferably be provided with some means for raising one platform sufficiently to lift the dowel pins 50 out of the holes 51, and for lowering the other platform to place the dowel pins in the holes. I have not shown such truck, because it does not constitute any part of this invention, but a brief description of the method of use will enable one to understand the practical advantages of removing the battery-supporting platform with the complete battery thereon as a unit.

Assuming that a vehicle requires a change of batteries, the operation would be performed as follows. One or both of the side plates 42 would be detached and set aside, thus leaving the battery compartment open at one or both sides for the removal of the battery. Access would thus be afforded to the battery compartment to disconnect the terminals of the battery from the terminals of the vehicle wiring. A truck such as I have suggested would then be wheeled under the battery-supporting platform and would be operated to lift the latter sufficiently to withdraw the dowel pins 50 from the holes 51. The truck would, of course, be arranged to carry the battery-supporting platform with the battery thereon in a direction substantially parallel to the bars 31. If a spare battery-supporting paltform with a charged battery were available the cells of the latter would preferably be connected with each other before being installed in the vehicle. The platform would be raised with relation to its truck high enough to enable the dowel pins 50 to clear the webs or shelves 30, and the truck would then be wheeled under the vehicle to carry the platform and battery between the hangers. The dowel pins 50 having been brought into register with the holes 51, the truck would be operated to lower the platform to the shelves 30. As shown by Figs. 4, 6 and 8, the dowel holes 51 are elongated so as to facilitate the placing of the pins therein. Having installed the platform with the charged battery, the terminals of the latter would be connected to the main terminals of the permanent wiring of the vehicle, and the detached side plate or plates 42 would be attached as hereinbefore explained.

I claim:

1. The combination with a vehicle, of a storage-battery carrier comprising a battery box, and means suspended from said vehicle for sustaining said box, said means including two shelves arranged apart from each other to enable a truck to pass between them and to underlie two opposite marginal portions of the bottom of said box to sustain said bottom, two opposite upright walls of said box being fixed to said sustaining means to brace the latter against stresses lengthwise of said shelves, said bottom being removable edgewise from said walls and sustaining means.

2. The combination with a vehicle, of a storage-battery carrier comprising a battery-supporting platform, means suspended from said vehicle for sustaining said platform, said means including coöperative shelves arranged to underlie and sustain opposite marginal portions of said platform, said platform being removable edgewise from said sustaining means, and disconnectible means arranged to connect said marginal portions with said shelves so that horizontal stresses in lines from one shelf to the other will be sustained by both said shelves and said platform conjointly.

3. The combination with a vehicle, of a storage battery carrier comprising coöperative hangers suspended from said vehicle and arranged apart from each other, coöperative shelves carried by said hangers and arranged to extend toward each other from said hangers, and a detachable battery-supporting platform adapted to rest upon said shelves and bridge the space between the latter, said platform being movable edgewise to and from the space between said hangers, said platform and shelves having coöperative dowels and sockets arranged to be disconnected from each other by upward movement of said platform relatively to said shelves.

4. The combination with a vehicle, of a storage-battery carrier comprising a structure permanently fastened to the vehicle and having coöperative shelves extending toward each other and arranged to enable a truck to pass between them, a detachable battery-supporting platform movable edgewise to and from said structure and adapted to rest upon said shelves and bridge the space between the latter, upstanding walls adapted to coöperate with said platform to form a box, and means other than said platform arranged to sustain said upstanding walls in coöperative box-forming relation to said platform, said means being adapted to permit detachment of one or more of the said upstanding walls.

In testimony whereof I have affixed my signature.

MARSHALL I. STONE.